United States Patent [19]

Sykes

[11] Patent Number: 4,938,706
[45] Date of Patent: Jul. 3, 1990

[54] ANTI-CORROSIVE BATTERY TERMINAL

[76] Inventor: Charles A. Sykes, 1928 Big Bend Rd., Adrian, Oreg. 97901

[21] Appl. No.: 181,342

[22] Filed: Apr. 14, 1988

[51] Int. Cl.$^5$ .......................... H01R 4/60; H01R 4/46
[52] U.S. Cl. .................... 439/202; 439/767; 439/522
[58] Field of Search ............... 439/202, 276, 522, 754, 439/767, 771, 893, 936, 205

[56] References Cited

U.S. PATENT DOCUMENTS

| | | | |
|---|---|---|---|
| 2,551,895 | 5/1951 | Noir | 439/202 |
| 2,622,120 | 12/1952 | Knasko et al. | 439/202 |
| 2,844,806 | 7/1958 | McKissick | 339/116 |
| 3,641,480 | 2/1972 | Robin | 439/202 |
| 4,521,067 | 6/1985 | DuFresne | 339/237 |
| 4,623,212 | 11/1986 | Hogan, Sr. | 339/236 |
| 4,681,497 | 1/1987 | Berecz | 411/377 |

*Primary Examiner*—P. Austin Bradley
*Attorney, Agent, or Firm*—Chernoff, Vilhauer, McClung & Stenzel

[57] ABSTRACT

An anti-corrosive battery terminal including a terminal block provided on its undersurface with a socket adapted to receive a battery post; a grease fitting, with check valve, mounted on the top of the terminal block and communicating with the socket for injection of grease therein; and one or more screw clamps for attaching the terminal block to the post. The screw clamps also double as terminal contact posts for attachment of electrical wiring.

25 Claims, 1 Drawing Sheet

U.S. Patent
Jul. 3, 1990
4,938,706
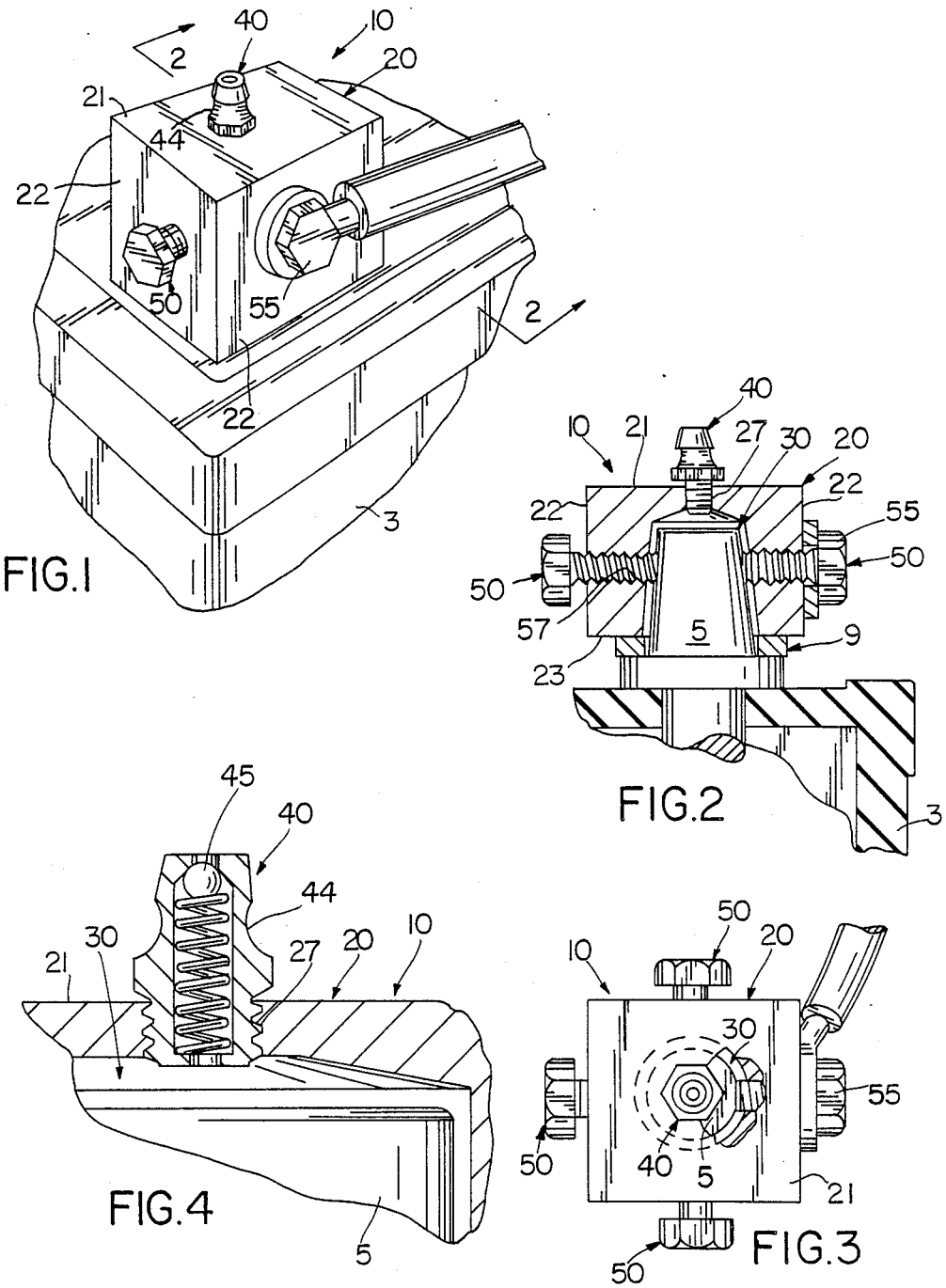

ANTI-CORROSIVE BATTERY TERMINAL

BACKGROUND OF THE INVENTION

1. Field of the Invention

This invention relates, in general, to corrosion protective covers for battery posts and, more particularly, to covers utilizing grease as an anti-corrosive medium.

2. Description of the Prior Art

The driving public is well aware of the continuing problems with battery post corrosion and the resultant electrical power loss because of wire erosion and poor contact points. Another common problem, experienced by operators of large trucks and commercial vehicles, is the lack of post contacts on a battery for connection to other batteries, auxiliary equipment, etc.

One of the earlier efforts at providing a protective cover was the invention of J. A. Johnson, U.S. Pat. No. 1,686,817, consisting of two complemental parts which were filled with grease and then clamped together about a battery post. A problem inherent with the Johnson device was the problem of obtaining good electrical contact because of the grease in that the grease had to be applied before clamping.

A device that is still widely used and quite effective is the fibrous washer of F. G. Dewey, U.S. Pat. No. 1,671,016, which is impregnated with acid resisting grease and which surrounds the base of the battery post. The Dewey device fails to protect the entire post.

A later device which does cover the post is that of H. D. Weaver, U.S. Pat. No. 2,269,296. The Weaver device suffers from the same problem as Johnson in that the post receiving socket must be coated with grease before placement, with resultant poor contact area. Weaver utilizes a tapered screw to make electrical contact after the grease placement.

Other relevant inventions are those of W. T. Hasting, U.S. Pat. No. 1,541,495; J. K. Schaefer, U.S. Pat. No. 2,119,294; W. M. Osborn, U.S. Pat. No. 3,152,854; and A. P. Bailey, U.S. Pat. No. 3,795,891.

None of the inventions solve the problem of utilizing a corrosion resistant grease to protect the entire surface of the battery post and still provide grease free electrical contacts.

SUMMARY OF THE INVENTION

The present invention comprises an anti-corrosive battery terminal including a terminal block with battery post receiving socket and provided with a grease fitting for injection of grease within the socket after the block is clamped to the battery post by screw clamps.

It is therefore a primary object of the present invention to provide an anti-corrosive battery terminal which includes a terminal block with post receiving socket which may be filled with grease after clamping contacts are made with the post.

More particularly it is an object of the present invention to provide an anti-corrosive battery terminal which includes a terminal block with socket and with screw clamps for making secure "dry" contact with the battery post before the addition of grease to the enveloping socket.

Even more particularly, it is an object of the present invention to provide an anti-corrosive battery terminal which includes a terminal block with grease fitting for injection of grease into a post receiving socket after electrical contacts are made to the post.

Another object of the present invention to provide an anti-corrosive battery terminal which includes a plurality of terminal contact posts.

It is an additional object of the present invention to provide an anti-corrosive battery terminal having contact posts which make direct contact with the battery post.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 1 is a perspective view of a battery terminal made according to the present invention, shown mounted to a battery post; the post and socket being shown in outline.

FIG. 2 is a sectional view taken along lines 2—2 of FIG. 1.

FIG. 3 is a plan view of the terminal of FIG. 1.

FIG. 4 is a sectional view of the grease fitting, with check valve, of the present invention.

DETAILED DESCRIPTION OF THE INVENTION

Referring now to the drawings, and, more particularly, to FIGS. 1, 2, and 3, an embodiment to be preferred of an anti-corrosive battery terminal 10, made according to the present invention is disclosed. Battery terminal 10 is in the form of a terminal block 20 defining a battery receiving socket 30; a grease fitting 40; and clamp means 50.

Terminal block 20 may be constructed of any suitable material, either electricity conducting or insulative. It is preferred however, that the block be made of conductive material for conduction of electricity to terminal contact posts 55, as will hereinafter be explained. Copper and bronze are preferred metals for construction of the block and doped plastics, also called conducting polymers, such as polyacetylene doped iodine, may also be highly desirable because of its high electrical conductivity as well as its ability to be molded. The block is preferably in the form of a cube, having outer surfaces including the top 21 and the four sides, designated generally by the numeral 22, and having an undersurface 23 on the opposing side from the top. Formed, by machining or otherwise, on the bottom surface 23 is a battery post receiving socket 30 which is slightly larger in all dimensions than the battery post 5 of battery 3. Also formed within block 20 is a threaded conduit 27, extending between socket 30 and the outer surface of the block. In the preferred embodiment conduit 27 extends between the socket and top surface 21 for the placement of grease fitting 40.

Grease fitting 40, one type of which is shown in FIG. 4, is provided with threads mateable with the threads of conduit 27 so that the fitting may be simply screwed into the conduit. Fitting 40, also known as a grease "zerk", includes a check valve, designated generally be the numeral 45, forming an effective seal, and also includes a post 44, rising vertically from block 20, for convenient engagement by a grease gun, not shown. While fitting 40 may be located anywhere on the block, for ready access it is mounted through top 21 of the block.

Also mounted on block 20 are a selected number of terminal contact posts 55 for the attachment of electrical wires leading to the starter, other batteries, auxiliary units, etc. Contact posts 55 are constructed of any suitable material and are preferably in the form of steel machine bolts which are screwed into threaded apertures 57 in the block. Where block 20 is constructed of electricity conducting material, electrical contact between posts 55 and block 20 may be sufficient, although it is always preferred that posts 55 make contact with the battery post 5. Where block 20 is constructed of electricity insulative material, contact between posts 55 and battery posts 5 must be made. It is obvious that one or more contact posts 55 may also serve as clamp means 50 for attachment of block 20 to the battery post.

For installation of terminal block 20 onto battery post 5, the battery post should be clean and free of oxides and other forms of corrosion and the interior surface of socket 30 of block 20 should also be free of grease or other contaminants. The block is simply placed over post 5 with socket 30 surrounding the post about the sides and top. If desired, though unnecessary, a porous fabric washer 9, well known in the art, may be placed around the base of battery post 5. Clamping means 50, in the form of contact post bolts 55, are then screwed into threaded apertures 57 until the flattened, blunt end of the bolt securely engages the battery post to obtain maximum electrical contact surface. While a single bolt may serve to clamp the block in place to the battery post, it is recommended that at least one other bolt 55 make contact with the post, and, as before stated, contact is necessary where block 20 is constructed of insulative material. Once bolts 55 are in place, corrosion preventive grease, or the like, is injected through grease fitting 40 into socket 30 to completely fill the socket. Excess grease exiting the base of the socket at the undersurface 23 of block 20 may simply be wiped away. If porous washer 9 is in place, air readily flows through the washer to prevent any air bubbles within the socket, and the washer soon becomes saturated with grease to form an air tight seal. It is to be particularly noted and is an important part of the invention that all contacts between terminal contact posts 55 or clamping means 50 and battery post 5 are made before the addition of any grease so that the grease, which is electrically insulative, can in no way impair the contacts. It is also to be noted that electrical contact can be made over a large surface area between the blunt end of bolts 55 and the battery post.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A battery terminal for mounting on a battery post, said terminal comprising:
   a terminal block constructed of a plastic electrically conducting polymer and having an undersurface and an outer surface, the undersurface provided with a socket for reception of a battery post, and said block defining a conduit between said socket and the outer surface of said block;
   a grease fitting located within said conduit for insertion of grease into said socket; and
   clamp means for attaching said terminal block to the battery post.

2. The battery terminal as described in claim 1 further comprising at least one terminal contact post mounted upon said terminal block.

3. The battery terminal as described in claim 1 further comprising an air porous fabric washer for mounting on the battery post below the undersurface of said terminal block for the expulsion of air upon filling said terminal block socket with grease through said grease fitting.

4. The battery terminal as described in claim 1 wherein said grease fitting is provided with a check valve.

5. The battery terminal of claim 1, said terminal block being substantially cube-shaped in configuration and having a plurality of faces including a top, wherein said conduit extends from said top of said terminal block to said socket, said terminal block further including a plurality of terminal contact posts, each of said terminal contact posts being located on a respective one of said faces of said terminal block.

6. A battery connector assembly for detachably connecting an electrical conduit to a pole of a battery, said assembly comprising:
   (a) a pole connector protruding from said battery and having an external surface area;
   (b) a terminal block detachably mounted on said battery and having an outer surface, said terminal block defining a socket having an interior which surrounds said external surface area of said pole connector, and defining an entryway to said socket through which said pole connector enters said socket;
   (c) sealing means associated with said entryway for impeding fluid flow through said entryway from the interior of said socket;
   (d) fluid conduit means in said terminal block communicating between the interior of said socket and the outer surface of said terminal block independently of said entryway for conducting fluid from said outer surface to the interior of said socket;
   (e) the interior of said socket loosely surrounding said pole connector so as to leave a fluid-containing space between a first portion of said external surface area of said pole connector and the interior of said socket; and
   (f) engagement means on the interior of said socket engaging said pole connector while covering not more than a second portion of said external surface area of said pole connector so as to leave said first portion of said external surface area exposed to said fluid-containing space, said first portion of said external surface area being interposed between said sealing means and said second portion of said external surface area.

7. The connector assembly of claim 6 wherein said first portion is at least a major portion of said external surface area of said pole connector and said second portion is a minor portion of said external surface area of said pole connector.

8. The battery connector assembly of claim 6 wherein said sealing means includes porous washer means mounted on said pole connector in said entryway for conducting air out of said socket during introduction of grease into said socket through said fluid conduit means.

9. The battery connector assembly of claim 6 wherein said terminal block is constructed of electrically conductive material.

10. The battery connector assembly of claim 6 wherein said terminal block is constructed of metal.

11. The battery connector assembly of claim 6 wherein said terminal block is contructed of copper.

12. The battery connector assembly of claim 6, including a grease fitting in communication with said fluid conduit means.

13. A battery connector assembly for detachably connecting an electrical conduit to a pole of a battery, said assembly comprising:
 (a) a pole connector protruding from said battery and having an external surface area;
 (b) a terminal block detachably mounted on said battery and having an outer surface, said terminal block defining a socket having an interior which surrounds said external surface area of said pole connector, and defining an entryway to said socket through which said pole connector enters said socket;
 (c) sealing means associated with said entryway for impeding fluid flow through said entryway from the interior of said socket;
 (d) fluid conduit means in said terminal block communicating between the interior of said socket and the outer surface of said terminal block independently of said entryway for conducting fluid from said outer surface to the interior of said socket;
 (e) the interior of said socket loosely surrounding said pole connector so as to leave a fluid-containing space between at least a major portion of said external surface area of said pole connector and the interior of said socket; and
 (f) engagement means on the interior of said socket engaging said pole connector while covering not more than a minor portion of said external surface area of said pole connector so as to leave a major portion of said external surface area exposed to said fluid-containing space.

14. The battery connector assembly of claim 13 wherein said major portion of said external surface area includes an area located between said entryway and said minor portion of said external surface area.

15. A battery terminal for mounting on a battery post, said terminal comprising:
 (a) a terminal block having an undersurface and an outer surface, the undersurface being provided with a socket for reception of a battery post, and said block defining a conduit between said socket and the outer surface of said block;
 (b) a grease fitting, including a check valve, located within said conduit for insertion of grease into said socket;
 (c) clamp means for attaching said terminal block to the battery post; and
 (d) a plurality of terminal contact posts mounted upon said terminal block.

16. The battery terminal as described in claim 15 wherein said terminal block is substantially cube-shaped in configuration; wherein said conduit extends from the top of said terminal block to said socket; and wherein each of said terminal contact posts is located on a respective face of said terminal block.

17. A battery for mounting on a battery post, said terminal comprising:
 (a) a terminal block constructed of electrically conductive material and having an undersurface and an outer surface, the undersurface being provided with a socket for reception of a battery post; said terminal block defining a conduit between said socket and the outer surface of said terminal block; and said terminal block being provided with a plurality of threaded bores;
 (b) a grease fitting, including a check valve, located within said conduit for insertion of grease into said socket; and
 (c) a plurality of threaded clamping screws, each of said clamping screws being disposed within a respective threaded bore of said terminal block for directly engaging the battery post for providing electrical conductivity and for clamping said terminal block to the battery post.

18. The battery terminal as described in claim 17 wherein said terminal block is substantially cube-shaped in configuration; wherein said conduit extends from the top of said terminal block to said socket; wherein said grease fitting includes a vertically extending tubular post receivable within a grease gun; and wherein each of said clamping screws functions as a terminal contact post, each clamping screw being located on a respective face of said terminal block.

19. The battery terminal as described in claim 17 further comprising an air porous fabric washer for mounting on the battery post below the undersurface of said terminal block for the expulsion of air upon filling said terminal block socket with grease through said grease fitting.

20. A battery connector assembly for detachably connecting an electrical conduit to a pole of a battery, said assembly comprising:
 (a) a pole connector protruding from said battery and having an external surface area;
 (b) a terminal block detachably mounted on said battery and having an outer surface, said terminal block defining a socket having an interior which surrounds said external surface area of said pole connector, and defining an entryway to said socket through which said pole connector enters said socket;
 (c) sealing means associated with said entryway for impeding fluid flow through said entryway from the interior of said socket;
 (d) fluid conduit means in said terminal block communicating between the interior of said socket and the outer surface of said terminal block independently of said entryway for conducting fluid from said outer surface to the interior of said socket;
 (e) the interior of said socket loosely surrounding said pole connector so as to leave a fluid-containing space between a first portion of said external surface area of said pole connector and the interior of said socket; and
 (f) engagement means on the interior of said socket engaging said pole connector while convering not more than a second portion of said external surface area of said pole connector so as the leave said first portion of said external surface area exposed to said fluid-containing space, said first portion of said external surface area being interposed between said sealing means and said second portion of said external surface area, and said engagement means including a plurality of clamping screws, each threadedly engaged in a respective threaded bore defined in said terminal block and movable into contact with said second portion of said external surface area of said pole connector, for clamping said terminal block to said pole connector.

21. The battery connector assembly of claim 20 wherein said terminal block is substantially cube-shaped and includes a top and a plurality of sides, and wherein said conduit means extends from the top of said block into said socket, each of said clamping screws being located on a respective side face of said terminal block and functioning as terminal contact post.

22. A battery connector assembly for detachably connecting an electrical conduit to a pole of a battery, said assembly comprising:
  (a) a pole connector protruding from said battery and having an external surface area;
  (b) a terminal block detachably mounted on said battery and having an outer surface, said terminal block being constructed of an electrically conductive plastic polymer and defining a socket having an interior which surrounds said external surface area of said pole connector, and defining an entryway to said socket through which said pole connector enters said socket;
  (c) sealing means associated with said entryway for impeding fluid flow through said entryway from the interior of said socket;
  (d) fluid conduit means in said terminal block communicating between the interior of said socket and the outer surface of said terminal block independently of said entryway for conducting fluid from said outer surface to the interior of said socket;
  (e) the interior of said socket loosely surrounding said pole connector so as to leave a fluid-containing space between a first portion of said external surface area of said pole connector and the interior of said socket; and
  (f) engagement means on the interior of said socket engaging said pole connector while convering not more than a second portion of said external surface area of said pole connector so as to leave said first portion of said external surface area exposed to said fluid-containing space, said first portion of said external surface area being interposed between said sealing means and said second portion of said external surface area.

23. A battery connector assembly for detachably connecting an electrical conduit to a pole of a battery, said assembly comprising:
  (a) a pole connector protruding from said battery and having an external surface area;
  (b) a terminal block detachably mounted on said battery and having an outer surface, said terminal block defining a socket having an interior which surrounds said external surface area of said pole connector, and defining an entryway to said socket through which said pole connector enters said socket;
  (c) at least one terminal contact post mounted upon said terminal block;
  (d) sealing means associated with said entryway for impeding fluid flow through said entryway from the interior of said socket;
  (e) fluid conduit means in said terminal block communicating between the interior of said socket and the outer surface of said terminal block independently of said entryway for conducting fluid from said outer surface to the interior of said socket;
  (f) the interior of said socket loosely surrounding said pole connector so as to leave a fluid-containing space between a first portion of said external surface area of said pole connector and the interior of said socket; and
  (g) engagement means on the interior of said socket engaging said pole connector while covering not more than a second portion of said external surface area of said pole connector so as to leave said first portion of said external surface area exposed to said fluid-containing space, said first portion of said external surface area being interposed between said sealing means and said second portion of said external surface area.

24. The battery connector assembly of claim 23 wherein said terminal block is substantially cube-shaped in configuration; wherein said conduit extends from the top of said block to said socket; and wherein each said terminal contact post is located on a respective face of said block.

25. A battery terminal for mounting on a battery post, said terminal comprising:
  (a) a terminal block constructed of electrically conductive plastic polymer and having an undersurface and an outer surface, the undersurface being provided with a socket for reception of a battery post, and said terminal block defining a conduit between said socket and the outer surface of said terminal block;
  (b) a grease fitting, including a check valve, located within said conduit for insertion of grease into said socket; and
  (c) clamp means for attaching said terminal block to the battery post.

* * * * *

UNITED STATES PATENT AND TRADEMARK OFFICE
CERTIFICATE OF CORRECTION

PATENT NO. : 4,938,706

DATED : July 3, 1990

INVENTOR(S) : Charles A. Sykes

It is certified that error appears in the above-identified patent and that said Letters Patent is hereby corrected as shown below:

Col. 2, Line 41:   After "doped" insert --with--

Col. 5, Line 67:   After "battery" (first occurrence) insert --terminal--

Col. 6, Line 61:   Change "as the" to --as to--

Signed and Sealed this

Tenth Day of September, 1991

Attest:

HARRY F. MANBECK, JR.

*Attesting Officer*   *Commissioner of Patents and Trademarks*